(12) United States Patent
Grant

(10) Patent No.: US 7,766,240 B1
(45) Date of Patent: Aug. 3, 2010

(54) CASE-LEVEL TRACEABILITY WITHOUT THE NEED FOR INLINE PRINTING

(75) Inventor: Elliott Grant, Redwood City, CA (US)

(73) Assignee: YottaMark, Inc., Redwood City, CA (US)

( * ) Notice: Subject to any disclaimer, the term of this patent is extended or adjusted under 35 U.S.C. 154(b) by 0 days.

(21) Appl. No.: 12/176,334

(22) Filed: Jul. 19, 2008

(51) Int. Cl.
G06K 7/10 (2006.01)
(52) U.S. Cl. ............ 235/462.01; 235/385; 283/79; 283/81
(58) Field of Classification Search ........... 235/375, 235/462, 385, 462.01, 462.32, 470, 494; 283/74, 79, 81, 101
See application file for complete search history.

(56) References Cited

U.S. PATENT DOCUMENTS

| | | | |
|---|---|---|---|
| 4,526,404 A * | 7/1985 | Vazquez ................ | 283/79 |
| 4,832,204 A | 5/1989 | Handy et al. | |
| 5,271,642 A | 12/1993 | Jahier et al. | |
| 5,343,529 A | 8/1994 | Goldfine et al. | |
| 5,360,628 A | 11/1994 | Butland | |
| 5,478,990 A * | 12/1995 | Montanari et al. ........ | 235/375 |
| 5,486,686 A | 1/1996 | Zdybel, Jr. et al. | |
| 5,569,317 A | 10/1996 | Sarada et al. | |
| 5,592,561 A | 1/1997 | Moore | |
| 5,611,948 A | 3/1997 | Hawkins | |
| 5,619,416 A * | 4/1997 | Kosarew ................ | 235/375 |
| 5,768,384 A | 6/1998 | Berson | |
| 5,895,073 A | 4/1999 | Moore | |
| 5,917,925 A | 6/1999 | Moore | |
| 6,005,960 A | 12/1999 | Moore | |
| 6,203,069 B1 | 3/2001 | Outwater et al. | |
| 6,211,789 B1 | 4/2001 | Oldham et al. | |
| 6,212,638 B1 | 4/2001 | Lee et al. | |
| 6,226,619 B1 | 5/2001 | Halperin et al. | |
| 6,231,435 B1 | 5/2001 | Pilger | |
| 6,246,778 B1 | 6/2001 | Moore | |

(Continued)

FOREIGN PATENT DOCUMENTS

WO WO 03/007252 A1 1/2003

(Continued)

OTHER PUBLICATIONS

U.S. Appl. No. 12/689,949, Elliott Grant, Voice Code with Primary and Secondary Digits, filed Jan. 19, 2010.

(Continued)

*Primary Examiner*—Thien Minh Le
*Assistant Examiner*—Minghui Yang
(74) *Attorney, Agent, or Firm*—Peters Verny, LLP

(57) ABSTRACT

A pre-printed case label is provided for labeling cases that contain item-level packages such as clamshells of produce or loose bulk produce. The pre-printed case label includes a common identifier and space for adding a tag that includes a unique identifier. A case that includes the pre-printed case label and the tag provides case-level traceability through the distribution chain. Additionally, the item-level packages, or items of loose bulk produce, can include their own individual traceability codes to extend the traceability down to the item level. Methods provided herein associate non-lot-specific information, like brand and quantity, and lot-specific information, like harvest event data, with the unique identifier.

11 Claims, 5 Drawing Sheets

U.S. PATENT DOCUMENTS

| | | | |
|---|---|---|---|
| 6,297,508 B1 | 10/2001 | Barmore et al. | |
| 6,329,920 B1 | 12/2001 | Morrison et al. | |
| 6,342,839 B1 | 1/2002 | Curkendall et al. | |
| 6,346,885 B1 | 2/2002 | Curkendall | |
| 6,361,079 B1 | 3/2002 | Kirkman | |
| 6,364,990 B1 | 4/2002 | Grosskopf et al. | |
| 6,398,106 B1 | 6/2002 | Ulvir et al. | |
| 6,428,640 B1 * | 8/2002 | Stevens et al. | 283/98 |
| 6,442,276 B1 | 8/2002 | Doljack | |
| 6,456,729 B1 | 9/2002 | Moore | |
| 6,536,672 B1 | 3/2003 | Outwater | |
| 6,612,494 B1 | 9/2003 | Outwater | |
| 6,664,897 B2 | 12/2003 | Pape et al. | |
| 6,680,783 B1 | 1/2004 | Pierce et al. | |
| 6,766,324 B2 | 7/2004 | Carlson et al. | |
| 6,788,800 B1 | 9/2004 | Carr et al. | |
| 6,796,504 B2 | 9/2004 | Robinson | |
| 6,805,926 B2 | 10/2004 | Cote et al. | |
| 6,806,478 B1 | 10/2004 | Hatfield | |
| 6,808,574 B1 | 10/2004 | Stevens et al. | |
| 6,859,672 B2 | 2/2005 | Roberts et al. | |
| 6,995,675 B2 | 2/2006 | Curkendall et al. | |
| 7,013,286 B1 | 3/2006 | Aggarwal et al. | |
| 7,040,532 B1 | 5/2006 | Taylor et al. | |
| 7,207,481 B2 | 4/2007 | Barenburg et al. | |
| 7,211,163 B2 * | 5/2007 | Kennedy | 156/247 |
| 7,222,791 B2 | 5/2007 | Heilper et al. | |
| 7,261,235 B2 | 8/2007 | Barenburg et al. | |
| 7,283,630 B1 | 10/2007 | Doljack | |
| 7,321,310 B2 | 1/2008 | Curkendall et al. | |
| 7,412,461 B2 | 8/2008 | Sholl et al. | |
| 7,519,825 B2 | 4/2009 | Geoffrey | |
| 2002/0004767 A1 | 1/2002 | Okamoto et al. | |
| 2002/0158765 A1 | 10/2002 | Pape et al. | |
| 2002/0178363 A1 | 11/2002 | Ambrogio et al. | |
| 2003/0080191 A1 * | 5/2003 | Lubow et al. | 235/462.01 |
| 2003/0177025 A1 | 9/2003 | Curkendall et al. | |
| 2003/0221108 A1 | 11/2003 | Rupp | |
| 2004/0200892 A1 | 10/2004 | Curkendall et al. | |
| 2005/0004682 A1 | 1/2005 | Gaddis et al. | |
| 2005/0247778 A1 | 11/2005 | Roberts | |
| 2005/0251449 A1 | 11/2005 | Pape et al. | |
| 2006/0004907 A1 | 1/2006 | Pape et al. | |
| 2006/0100964 A1 | 5/2006 | Wilde et al. | |
| 2006/0111845 A1 * | 5/2006 | Forbis et al. | 702/19 |
| 2006/0161443 A1 | 7/2006 | Rollins | |
| 2006/0180661 A1 | 8/2006 | Grant et al. | |
| 2006/0187048 A1 | 8/2006 | Curkendall et al. | |
| 2007/0051362 A1 * | 3/2007 | Sullivan et al. | 604/500 |
| 2007/0119954 A1 | 5/2007 | Barenburg et al. | |
| 2007/0119955 A1 | 5/2007 | Barenburg et al. | |
| 2007/0170240 A1 | 7/2007 | Grant et al. | |
| 2007/0175974 A1 | 8/2007 | Self et al. | |
| 2007/0203724 A1 | 8/2007 | Farmer et al. | |
| 2007/0203818 A1 | 8/2007 | Farmer et al. | |
| 2007/0205258 A1 | 9/2007 | Self et al. | |
| 2008/0011841 A1 | 1/2008 | Self et al. | |
| 2008/0011843 A1 | 1/2008 | Barenburg et al. | |
| 2008/0030348 A1 | 2/2008 | Pape et al. | |
| 2008/0046263 A1 | 2/2008 | Sager et al. | |
| 2008/0178197 A1 | 7/2008 | Pape et al. | |
| 2008/0215484 A1 | 9/2008 | Oldham et al. | |
| 2009/0242631 A1 | 10/2009 | Wishnatzki et al. | |

FOREIGN PATENT DOCUMENTS

WO    WO 2006/084090 A2    8/2006

OTHER PUBLICATIONS

Office Actions and Responses thereto in U.S. Appl. No. 11/347,424 "Method and System for Deterring Product Counterfeiting, Diversion and Piracy" Sep. 18, 2009.

International Search Report and Written Opinion for PCT/US08/75626 "Attributing Harvest Information with Unique Identifiers" Dec. 2, 2008.

International Search Report for PCT/US06/03768 "Method and System for Deterring Product Counterfeiting, Diversion and Piracy" Jun. 12, 2008.

* cited by examiner

CASE-LEVEL TRACEABILITY WITHOUT THE NEED FOR INLINE PRINTING

CROSS-REFERENCE TO RELATED APPLICATIONS

This application is related to, and incorporates by reference U.S. Provisional Patent Applications No. 60/970,933 filed on Sep. 7, 2007 and titled "Attributing Harvest Information with Unique Identifiers," No. 61/028,163 filed on Feb. 2, 2008 and titled "Systems and Methods of Associating Individual Packages with Harvest Crates," and No. 61/080,121 filed on Jul. 11, 2008 and titled "Mobile Table for Implementing Clamshell-to-Case Association."

BACKGROUND OF THE INVENTION

1. Field of the Invention

The present invention relates generally to the field of consumer product traceability, and more specifically to case-level traceability for products such as fresh produce.

2. Description of the Prior Art

Produce is often packaged in unit-level packaging (sometimes referred to as fixed-weight consumer packs), such as clamshells, either in the field or at a packing facility. Unit-level packages provide retailers with a standardized merchandizing unit, offer brand owners a labeling opportunity, and offer convenience to the consumer. Unit-level packages of produce like tomatoes and strawberries are typically aggregated into cases for distribution. In various industries these cases are sometimes also referred to as trays or flats. Cases are typically characterized by an open top so that clamshells or similar unit-level packages can be readily packed together and later readily removed by retailers or consumers. The open top also allows the produce in the clamshells to be displayed while still in the case.

One problem in industries such as the produce industry, but also in similar industries like the processed foods and pharmaceuticals industries, relates to the traceability of goods through the supply chain from raw ingredients to the consumer. Traceability becomes particularly important during product recalls, but can also be useful for utilizing consumer feedback to improve quality and for marketing purposes. In view of the rising importance of traceability in the produce industry in particular, new guidelines are being developed to improve produce traceability from the fields to the consumer. These guidelines require the use of labels on cases that are readable both by humans and machines. The labels need to provide enough information that particular cases can be traced back to particular lots. An example of such guidelines are the Fresh Produce Traceability Guidelines, Version 2, October 2006, being jointly promulgated by the Produce Marketing Association and the Canadian Produce Marketing Association, and incorporated herein by reference.

Prior attempts to add such traceability to produce at the case-level has been achieved by writing lot-specific information on each case. In some prior art implementations, such information has been printed on cases with inkjet systems. Problems with the use of inkjet systems to mark cases include (a) inkjet systems require considerable maintenance, (b) printing tends to be poor quality and therefore difficult to read, and (c) typical inkjet systems cannot print high resolution barcodes, and such barcodes are needed for automated scanning such as along the distribution chain. Additionally, for small operations and operations with a lot of packing lines, the need for adding in-line printing capabilities is onerous and expensive.

SUMMARY

An exemplary case label comprises a first field that provides case contents, a first identifier including a data structure that is both machine-readable and human-readable, and a second field disposed proximate to the first identifier, the second field comprising an area sufficient to accept a tag including a second identifier. The case label can further comprising an adhesive backing. In various embodiments, the data structure of the first identifier comprises a machine-readable barcode and human-readable alphanumeric characters, for example, a Global Trade Identification Number (GTIN) data structure. In some of these embodiments a barcode symbology employed for the barcode is Code 128. The second field on the case label for accepting the tag includes, in some embodiments, an indicium to indicate that the second field is intended for the placement of the tag. The second field can also be disposed to the right of the first identifier.

An exemplary case comprises a case label disposed on the case where the case label includes a first identifier including a first data structure that is both machine-readable and human-readable, and a field disposed proximate to the first identifier, the field comprising an area sufficient to accept a tag including a second identifier. The case can also comprise the tag disposed on the case, where the tag includes the second identifier having a second data structure that is both machine-readable and human-readable. In some of these embodiments the tag is further disposed on the field of the case label proximate to the first identifier. Regarding the second data structure, this can also comprise a machine-readable barcode and human-readable alphanumeric characters, such as a GTIN data structure. In some of these embodiments a barcode symbology employed for the barcode is Code 128. In further embodiments, the case also contains a plurality of unit-level packages, such as clamshells. In some of these embodiments, each unit-level package includes a traceability code.

A method for establishing case-level traceability comprises affixing a case label to a case, where the case label includes a first identifier having a first data structure that is both machine-readable and human-readable. The first identifier can be associated with certain non-lot-specific information. The method also comprises affixing a tag to the case, where the tag includes a second identifier having a second data structure that is both machine-readable and human-readable. The method further comprises storing lot-specific information, such as the harvest date, in association with the second identifier. Non-lot-specific information can also be associated with the second identifier. The method can also further comprise reading the first identifier together with the second identifier. In further embodiments, the method comprises filling the case with a plurality of unit-level packages. In some of these embodiments the method further comprises marking each unit-level package with a traceability code. Some of these embodiments, in turn, can further comprise storing a traceability code of a unit-level package in association with the second identifier.

Another method for establishing case-level traceability comprises affixing a tag to a case label disposed on a case, where the case label includes a first identifier including a first data structure that is both machine-readable and human-readable, and where the tag includes a second identifier including a second data structure that also is both machine-readable and human-readable. This method further comprises storing lot-specific information in association with the second identifier, and can also comprise storing non-lot-specific information with the second identifier. Embodiments of this method can further comprise filling the case with a plurality of unit-level packages, some of these embodiments can also comprise marking each unit-level package with a traceability code, and some of these embodiments can further comprise storing a traceability code of a unit-level package in association with the second identifier.

DETAILED DESCRIPTION OF THE INVENTION

The present disclosure is directed to improving the traceability of goods in the supply chain. Accordingly, unique identifiers that are both machine-readable and human-readable, in accordance with the traceability guidelines noted above, are added to cases. In one implementation, a pre-printed standard case label includes a common identifier associated with non-lot-specific information common to the items in every case, such as brand name. This case label is applied to every case, sometimes well in advance of packing the case with item-level packages such as clamshells of produce. A tag is later added to each case, more temporally proximate to the act of packing the case, where the tag includes the unique identifier. The unique identifier is associated with lot-specific information and may also be associated with non-lot-specific information. In some instances, the case label includes a space designated for adding the tag next to the common identifier.

Additionally, in some embodiments, each item-level package in the case is marked with a further unique traceability code that can be associated with the unique identifier on the tag on the case to provide traceability from the case level down to the item level. The use of pre-printed labels as the tags makes adding unique identifiers to the cases simple, inexpensive, and obviates the need for inline printing. The use of unique identifiers that are associated with lot-specific information maintains the confidentiality of information such as pack and pick dates from the casual observer, while allowing such information to be readily determined when necessary, such as during a product recall. It will be appreciated that the use of pre-printed labels for the case label, the tag, and to mark the item-level packages permits packers to comply with emerging standards for case-level traceability without having to install and maintain inkjet or other inline printing systems.

Figure 1:
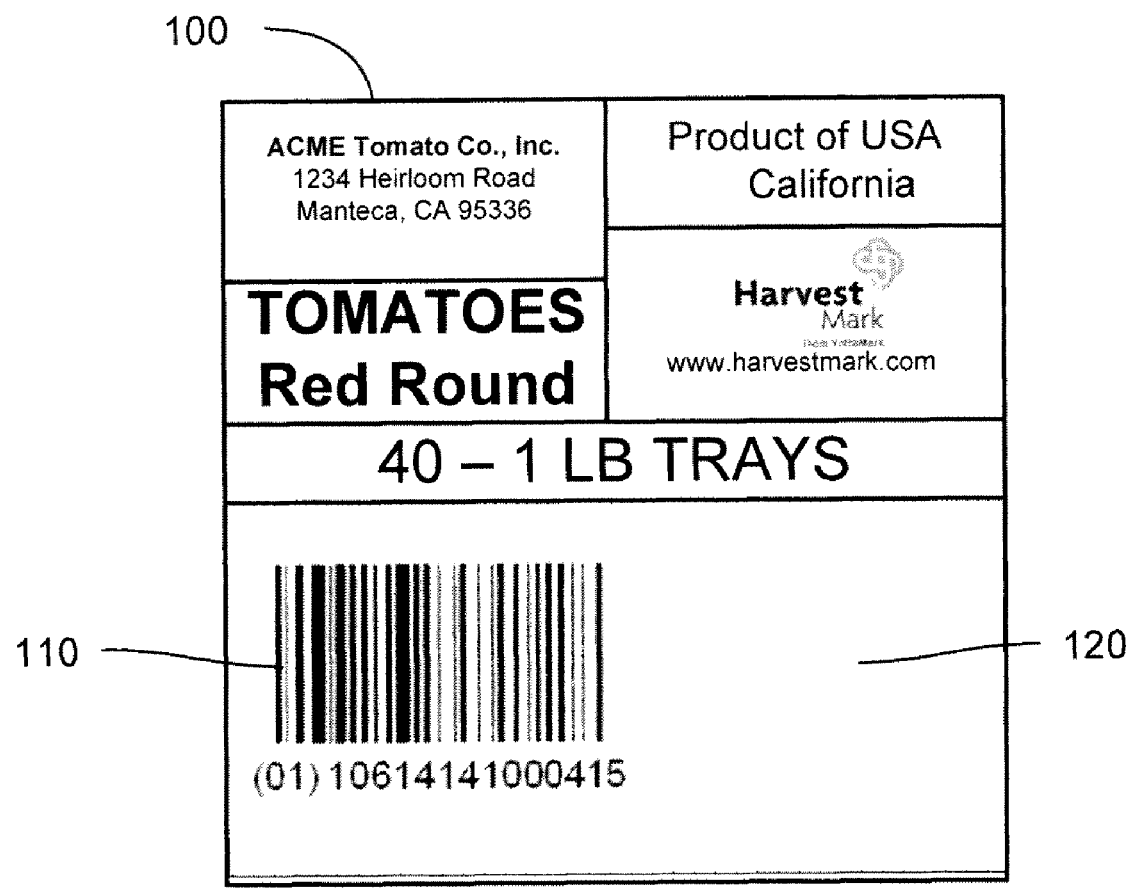
FIG. 1 shows a case label according to an exemplary embodiment of the invention.

FIG. 1 shows a case label 100 according to an exemplary embodiment of the invention. The case label 100, in some embodiments, includes an adhesive backing, though it will be appreciated that the case label 100 can be secured to a case in other ways, such as with staples. In still other embodiments, the case label 100 can be printed directly onto the case. The case label 100 can optionally comprise one or more fields that provide various information including the case contents, the country or region of origin, and the producer, as illustrated. In some embodiments, the case label 100 can also comprise a Uniform Resource Locator (URL) for a website through which lot-specific information can be obtained.

The case label 100 comprises an identifier 110 including a data structure that is both machine-readable and human-readable. The data structure can be, for example, a GTIN data structure encoded as a machine-readable barcode and as human-readable alphanumeric characters. In some embodiments, the barcode symbology employed for the barcode is Code 128, though other symbologies can be used. Here, the identifier 110 is associated with certain non-lot-specific information, i.e., information that does not change on a lot-to-lot basis such as brand name, type of product (e.g., strawberries), quantity per unit, and so forth. Where the identifier 110 is a GTIN, this information comprises a code for the manufacturer and a Stock Keeping Unit (SKU).

Figure 2:
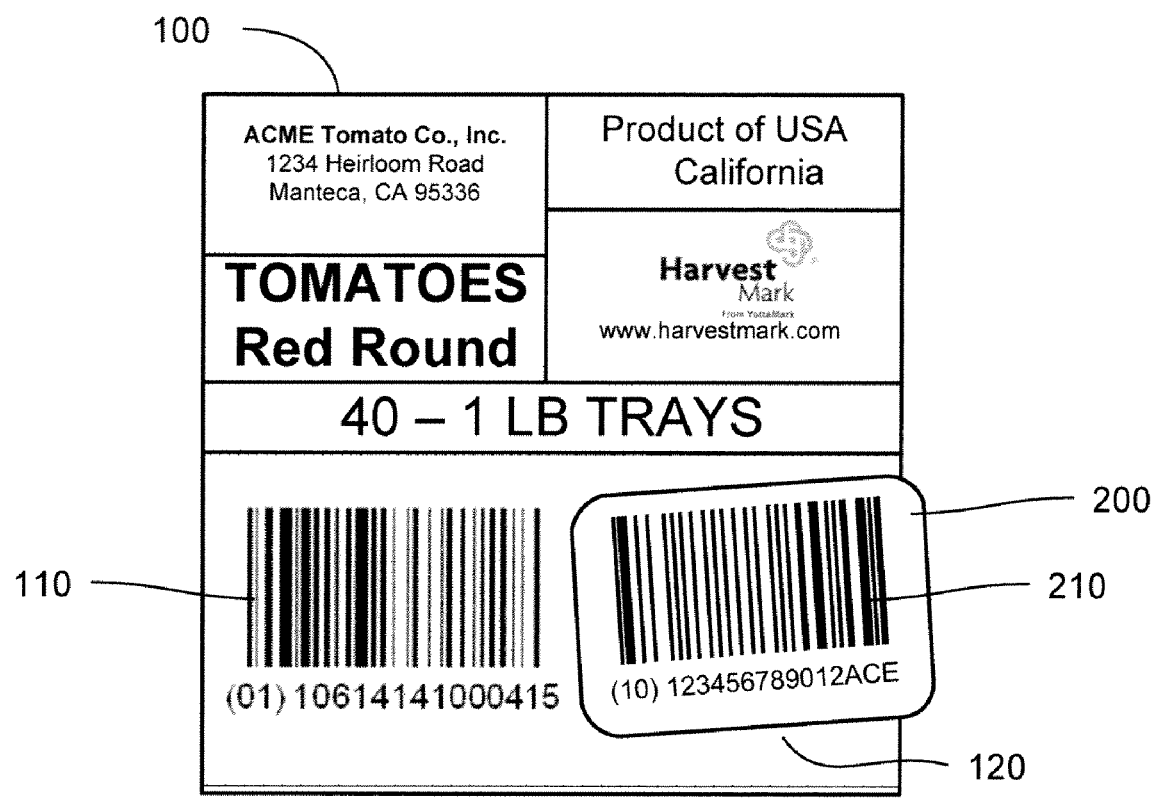
FIG. 2 shows the case label of FIG. 1 having a tag disposed thereon.
Figure 3:
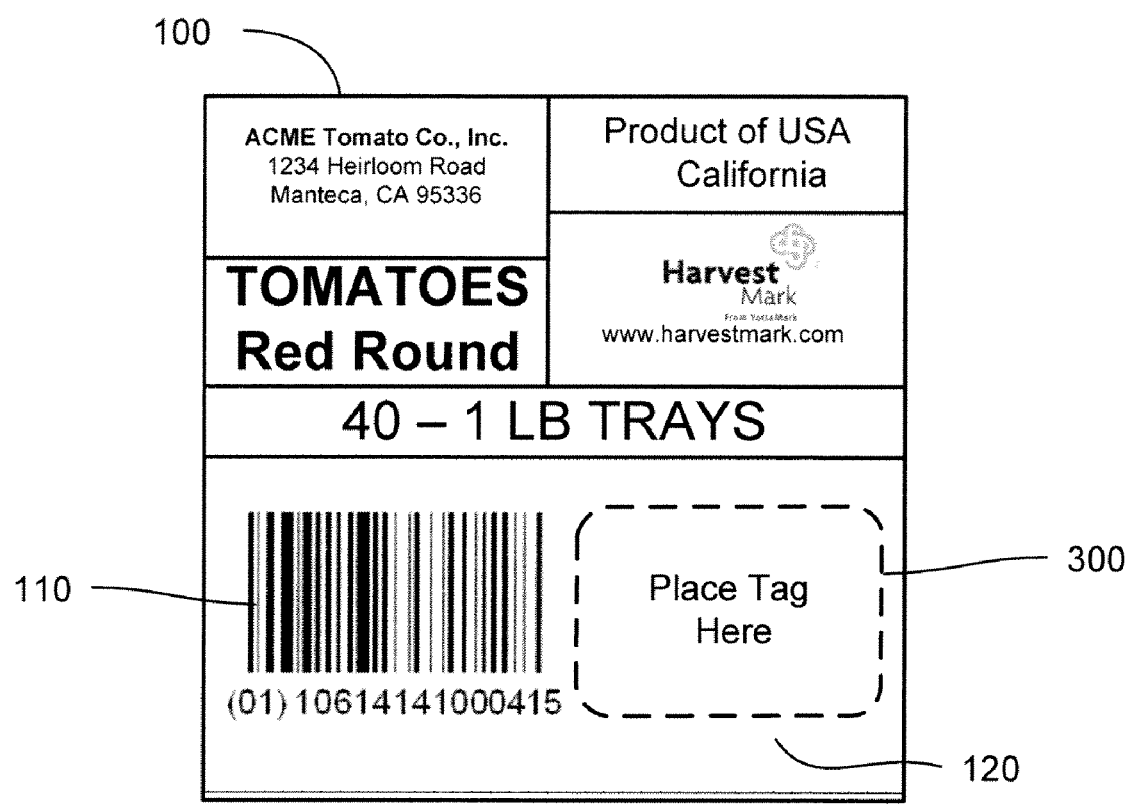
FIG. 3 shows a case label according to another exemplary embodiment of the invention.

The case label 100 also comprises a field 120 disposed proximate to the identifier 110. The field 120 comprises an area sufficient to accept a tag 200 including an identifier 210, as shown in FIG. 2. The field 120 does not have to be larger than the tag 200 to accept the tag 200, though in some embodiments the field 120 is larger than the tag 200, and in some embodiments the field 120 is of approximately similar dimensions to the tag 200. In some embodiments, the field 120 is disposed to the right of the identifier 110 on the case label 100, though the field 120 can be to the left, above, or below the identifier 110. As illustrated in FIG. 3, the field 120 can include an indicium 300 to indicate that the field 120 is intended for the placement of the tag 200. Exemplary indicia 300 include an outline of the tag 200 and text, as shown.

Referring again to FIG. 2, the tag 200 can be an adhesive-backed label, for example. The identifier 210 includes a data structure that is both machine-readable and human-readable. In some embodiments, the data structure of the identifier 210 can be the same as the data structure of the identifier 110. The data structure of the identifier 210 can be, for example, a GTIN data structure encoded as a machine-readable barcode and as human-readable alphanumeric characters. In some embodiments, the barcode symbology employed for the barcode is Code 128, though other symbologies can be used. Here, the identifier 210 is associated with lot-specific information such as harvest event data like the harvest date, weather conditions, harvesting crew, packing house, and so forth. The identifier 210 can also be associated with non-lot-specific information.

Figure 4:
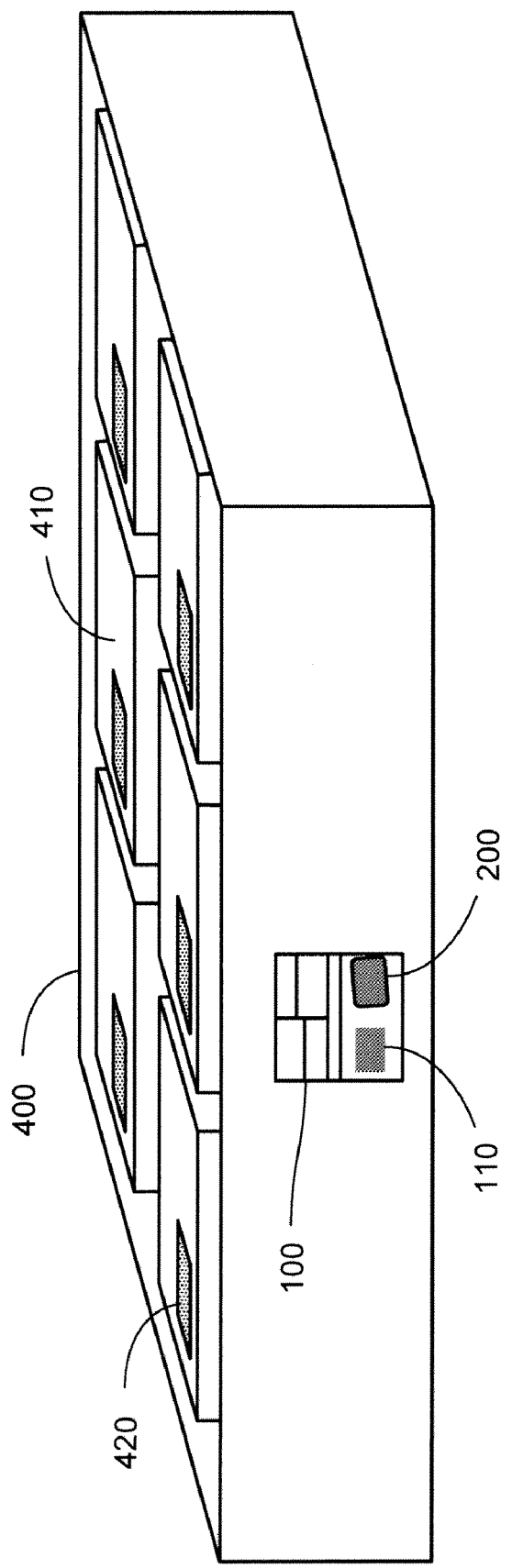
FIG. 4 shows a case including the case label and tag of FIG. 2 according to an exemplary embodiment of the invention.

FIG. 4 shows a case 400 including a case label 100 according to an exemplary embodiment of the invention. The case label 100 includes an identifier 110 and a tag 200. The case 400 also contains a plurality of unit-level packages 410 such as clamshells. Each unit-level package 410 includes a traceability code 420. The traceability codes 420 can be printed on adhesive-backed labels, for example, and applied to the unit-level packages 410 either before or after the unit-level packages 410 have been filled with produce.

Exemplary methods for generating and printing traceability codes are described, for example, in U.S. patent application Ser. No. 11/743,648 filed on May 2, 2007 and titled "System and Method of Product Information Coding and Authentication" which is a Continuation-in-Part of U.S. patent application Ser. No. 11/347,424 filed on Feb. 2, 2006 and titled "Method and System for Deterring Product Counterfeiting, Diversion and Piracy," which claims priority from U.S. Provisional Patent Application No. 60/650,364 filed on Feb. 3, 2005 and titled "System, Method and Technique for Combating Product Counterfeiting, Piracy and Diversion," each of which is incorporated herein by reference.

Figure 5:
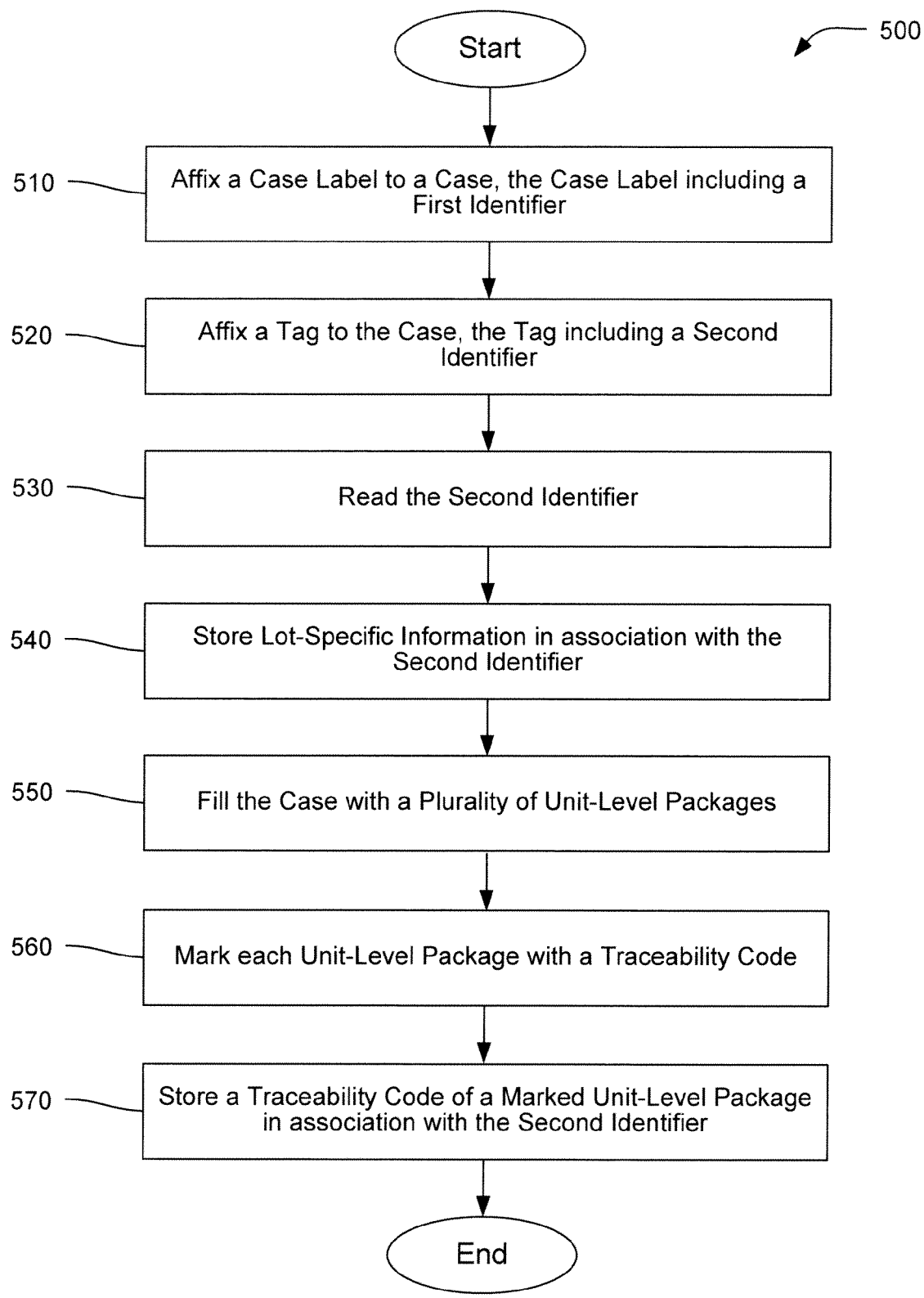
FIG. 5 is a flowchart representation of a method 500 for establishing case-level traceability according to an exemplary embodiment of the invention.

FIG. 5 is a flowchart representation of a method 500 for establishing case-level traceability according to an exemplary embodiment of the invention. The method 500 comprises a step 510 of affixing a case label to a case, where the case label includes a first identifier having a first data structure that is both machine-readable and human-readable. The method 500 also comprises a step 520 of affixing a tag to the case, where the tag includes a second identifier having a second data structure that is both machine-readable and human-readable, an optional step 530 of reading the second identifier, and a step 540 of storing lot-specific information in association with the second identifier. The method 500 can also comprise an optional step 550 of filling the case with a plurality of unit-level packages, an optional step 560 of marking each unit-level package with a traceability code, and an optional step 570 of storing a traceability code of a marked unit-level package in association with the second identifier.

Step 510 comprises affixing a case label to a case, where the case label includes a first identifier having a first data structure that is both machine-readable and human-readable. Here, affixing the case label can include adhering the case label with an adhesive backing to the case, or otherwise securing the case label to the case, such as with staples. In some embodiments, affixing the case label is performed by hand, or with a hand-held applicator. Affixing the case label can also be automated. Step 510 can also comprise printing the case label information directly on the case. Step 510 can be performed by a manufacturer of the cases before the cases are shipped to the packer, or by the packer after receipt of the cases. When performed by the packer, step 510 can be performed well before the tag is affixed in step 520 and before the case is filled in step 550, though both steps 510 and 520 can be performed after the case is filled in step 550.

Step 520 comprises affixing a tag to the case, where the tag includes a second identifier having a second data structure that is both machine-readable and human-readable. Here, the tag can be a label with an adhesive backing such that affixing the tag to the case can comprise adhering the tag to the case. In further embodiments, the tag is adhered to the case label, and in some of these embodiments the tag is adhered to a field on the case label, where the field is sized to accept the tag. In some embodiments, step 520 also comprises removing the tag from a sheet or roll of tags, for example, where each tag includes a different second identifier. In this way a series of cases can be created where each case has a common first identifier and a unique second identifier.

In optional step 530 the second identifier is read. In some embodiments, this step is performed after the tag has been affixed to the case, while in other embodiments the second identifier is read from the tag just prior to being affixed to the case. The second identifier can be read with a barcode scanner, for example. In some embodiments, the first and second identifiers are generally aligned on the case, or on the case label itself, so the two can be read together. The second identifier can be read with a hand-held scanner or a fixed-position scanner that reads barcodes as they pass a location on a packing line, for example.

In step 540 lot-specific information is stored in association with the second identifier. Lot-specific information can be recorded, for instance, on a harvest form by a supervisor in the field. In some embodiments, such as those in which a roll of tags is used in step 520 to affix tags to cases, a first tag from the roll is first placed on the harvest form as part of step 540, a plurality of tags are then removed from the roll and affixed to cases in step 520, and then a last tag from the roll is finally placed on the harvest form next to the first tag, again as part of step 540. Here, given a known sequence of second identifiers on the tags on the roll, each of the second identifiers in the sequence between the second identifiers on the first and last tags placed on the harvest form can be associated with the lot-specific information on the harvest form. As another example, each harvest form can include a unique identifier that is scanned each time a second identifier on a tag is scanned. In a similar manner, in step 540 non-lot-specific information can also be associated with the second identifier.

Steps 520, 530, and 540 are shown in FIG. 5 as occurring before step 550 of filling the case with unit-level packages, but it will be understood that the order shown is merely exemplary and many other orders to the steps of the method 500 are possible. As just noted for example, step 540 can begin before step 520. Continuing with the example of placing tags from a roll on both a harvest form and a plurality of cases, well after tags have been affixed to cases in step 520 and the cases have been filled with item-level packages in step 550, the step 540 can be completed by taking the harvest form to an office, scanning the first and last tags with a barcode reader, and manually entering the lot-specific information through a GUI. In this way, the second identifiers of the tags in the sequence between the first and last tags placed on the harvest form can be stored in associated with the lot-specific information, for example, in a database. It will be appreciated that the step 530 is optional in this example, since it is not necessary to read the second identifier from the tags on any cases in order to store lot-specific information in association with the second identifiers on such tags. It will also be understood that any number of the tags, including all of the tags can be scanned in step 530.

In some embodiments, the method 500 also comprises the optional steps 550, 560, and 570. In step 550 the case is filled with a plurality of unit-level packages. Here, unit-level packages such as clamshells are filled with produce from a given lot and added to the case.

In step 560 each unit-level package is marked with a traceability code. For example, adhesive-backed labels, each with a traceability code, can be adhered to the unit-level packages in the case. In other embodiments, step 560 can be performed well in advance of the step 550. For instance, the traceability codes can be printed on the clamshells, or labels that include the traceability codes can be adhered to the clamshells, before the clamshells are brought to the field to be filled with produce.

In step 570 a traceability code of a marked unit-level package is stored in association with the second identifier. This step can be achieved, for example, by reading the second identifier from the tag on the case, as in step 530, and also reading the traceability code from the marked unit-level package in the case.

The present invention also provides computing systems capable of performing steps of the method 500. Such computing systems include processing means, such as a general purpose processor. Such computing systems also include logic configured to receive the identifiers, traceability codes, and both lot-specific and non-lot-specific information as inputs from scanners and GUIs, for example; logic configured to make associations between these inputs; as well as logic configured to store the associations in databases, for instance.

A computing system may comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital information, such as in a database. The logic noted above can comprise hardware, firmware, or software stored on a computer-readable medium, or combinations thereof.

After being packed, a case that is labeled as described above can be readily tracked through the distribution chain due to the presence of both the first and second identifiers on the exterior of the case. The traceability codes on the unit-level packages, and the stored associations described above, allows a buyer or consumer to enter a code from a unit-level package through a website or a kiosk, for example, to obtain at least some of the lot-specific and non-lot-specific information for that unit-level package. An FDA inspector, on the other hand, can use the identifiers, traceability codes, and associations to trace a problem back from a case or particular unit-level package to a given lot, and then trace forward to each case that was filled from that lot, and then determine from tracking records through the distribution chain where those cases were sent. In the event of a recall, those traceability codes associated with the second identifiers on cases that were packed from an affected lot can be identified. By way of the traceability codes on the unit-level packages, retailers and consumers can verify whether or not the unit-level packages are subject to the recall.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
    affixing a case label to a case, the case label including a first identifier having a first data structure that is both machine-readable and human-readable;
    affixing a tag to the case, the tag including a second identifier having a second data structure that is both machine-readable and human-readable; and
    storing lot-specific information in association with the second identifier;
    reading the first identifier simultaneously with the second identifier.

2. The method of claim 1 wherein affixing the tag to the case comprises adhering the tag to the case label.

3. The method of claim 1 further comprising reading the second identifier.

4. The method of claim 1 wherein the lot-specific information comprises a harvest date.

5. The method of claim 1 further comprising filling the case with a plurality of unit-level packages.

6. The method of claim 5 further comprising marking each unit-level package with a traceability code.

7. The method of claim 6 further comprising storing a traceability code of a unit-level package in association with the second identifier.

8. A method comprising:
    affixing a tag to a case label disposed on a case,
        the case label including a first identifier including a first data structure that is both machine-readable and human-readable,
        the tag including a second identifier including a second data structure that is both machine-readable and human-readable;
    storing lot-specific information in association with the second identifier; and
    reading the first identifier simultaneously with the second identifier.

9. The method of claim 8 further comprising filling the case with a plurality of unit-level packages.

10. The method of claim 9 further comprising marking each unit-level package with a traceability code.

11. The method of claim 10 further comprising storing a traceability code of a unit-level package in association with the second identifier.

* * * * *